United States Patent
Bigman et al.

(10) Patent No.: US 10,409,787 B1
(45) Date of Patent: Sep. 10, 2019

(54) DATABASE MIGRATION

(71) Applicant: EMC Corporation, Hopkinton, MA (US)

(72) Inventors: Ron Bigman, Holon (IL); Assaf Natanzon, Tel Aviv (IL); Jehuda Shemer, Kfar Saba (IL); Amit Lieberman, Raanana (IL); Yana Vaisman, Netanya (IL); Oded Peer, Raanana (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 231 days.

(21) Appl. No.: 14/978,378

(22) Filed: Dec. 22, 2015

(51) Int. Cl.
| G06F 17/30 | (2006.01) |
| G06F 7/00 | (2006.01) |
| G06F 16/21 | (2019.01) |
| G06F 17/27 | (2006.01) |
| G06F 16/22 | (2019.01) |

(52) U.S. Cl.
CPC ........... G06F 16/214 (2019.01); G06F 16/22 (2019.01); G06F 17/2705 (2013.01)

(58) Field of Classification Search
CPC ............. G06F 17/303; G06F 17/30312; G06F 17/2705
USPC ........................................................ 707/809
See application file for complete search history.

(56) References Cited

U.S. PATENT DOCUMENTS

| 7,203,741 B2 | 4/2007 | Marco et al. |
| 7,719,443 B1 | 5/2010 | Natanzon |
| 7,840,536 B1 | 11/2010 | Ahal et al. |
| 7,840,662 B1 | 11/2010 | Natanzon |
| 7,844,856 B1 | 11/2010 | Ahal et al. |
| 7,860,836 B1 | 12/2010 | Natanzon et al. |
| 7,882,286 B1 | 2/2011 | Natanzon et al. |
| 7,934,262 B1 | 4/2011 | Natanzon et al. |
| 7,958,372 B1 | 6/2011 | Natanzon |
| 8,037,162 B2 | 10/2011 | Marco et al. |
| 8,041,940 B1 | 10/2011 | Natanzon et al. |
| 8,060,713 B1 | 11/2011 | Natanzon |
| 8,060,714 B1 | 11/2011 | Natanzon |
| 8,103,937 B1 | 1/2012 | Natanzon et al. |
| 8,108,634 B1 | 1/2012 | Natanzon et al. |
| 8,214,612 B1 | 7/2012 | Natanzon |
| 8,250,149 B2 | 8/2012 | Marco et al. |
| 8,271,441 B1 | 9/2012 | Natanzon et al. |
| 8,271,447 B1 | 9/2012 | Natanzon et al. |
| 8,332,687 B1 | 12/2012 | Natanzon et al. |
| 8,335,761 B1 | 12/2012 | Natanzon |
| 8,335,771 B1 | 12/2012 | Natanzon et al. |

(Continued)

OTHER PUBLICATIONS

U.S. Appl. No. 14/496,783, filed Sep. 25, 2014, Natanzon et al.

(Continued)

*Primary Examiner* — Kuen S Lu

(74) *Attorney, Agent, or Firm* — Daly, Crowley Mofford & Durkee, LLP

(57) ABSTRACT

In one aspect, a method includes migrating a database object from a source database to a target database, updating a storage of the location of the DB object to be the target database, directly accessing one of the target database and the source database during the migrating and executing, during the migrating, a database command by retrieving the DB object from the other one of the target database and the source database.

20 Claims, 4 Drawing Sheets

(56) References Cited

U.S. PATENT DOCUMENTS

| | | |
|---|---|---|
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B2 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,003,149 B2 * | 4/2015 | Kathmann .......... G06F 3/0607 711/165 |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,305,009 B1 | 4/2016 | Bono et al. |
| 9,323,750 B2 | 4/2016 | Natanzon et al. |
| 9,330,155 B1 | 5/2016 | Bono et al. |
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | BenHanokh et al. |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 9,594,822 B1 | 3/2017 | Natanzon et al. |
| 9,600,377 B1 | 3/2017 | Cohen et al. |
| 9,619,543 B1 | 4/2017 | Natanzon et al. |
| 9,632,881 B1 | 4/2017 | Natanzon |
| 9,665,305 B1 | 5/2017 | Natanzon et al. |
| 9,710,177 B1 | 7/2017 | Natanzon |
| 9,720,618 B1 | 8/2017 | Panidis et al. |
| 9,722,788 B1 | 8/2017 | Natanzon et al. |
| 9,727,429 B1 | 8/2017 | Moore et al. |
| 9,733,969 B2 | 8/2017 | Derbeko et al. |
| 9,737,111 B2 | 8/2017 | Lustik |
| 9,740,572 B1 | 8/2017 | Natanzon et al. |
| 9,740,573 B1 | 8/2017 | Natanzon |
| 9,740,880 B1 | 8/2017 | Natanzon et al. |
| 9,749,300 B1 | 8/2017 | Cale et al. |

(56) References Cited

U.S. PATENT DOCUMENTS

| | | |
|---|---|---|
| 9,772,789 B1 | 9/2017 | Natanzon et al. |
| 9,798,472 B1 | 10/2017 | Natanzon et al. |
| 9,798,490 B1 | 10/2017 | Natanzon |
| 9,804,934 B1 | 10/2017 | Natanzon et al. |
| 9,811,431 B1 | 11/2017 | Natanzon et al. |
| 9,823,865 B1 | 11/2017 | Natanzon et al. |
| 9,823,973 B1 | 11/2017 | Natanzon |
| 9,832,261 B2 | 11/2017 | Don et al. |
| 9,846,698 B1 | 12/2017 | Panidis et al. |
| 9,875,042 B1 | 1/2018 | Natanzon et al. |
| 9,875,162 B1 | 1/2018 | Panidis et al. |
| 9,880,777 B1 | 1/2018 | Bono et al. |
| 9,881,014 B1 | 1/2018 | Bono et al. |
| 9,910,620 B1 | 3/2018 | Veprinsky et al. |
| 9,910,621 B1 | 3/2018 | Golan et al. |
| 9,910,735 B1 | 3/2018 | Natanzon |
| 9,910,739 B1 | 3/2018 | Natanzon et al. |
| 9,917,854 B2 | 3/2018 | Natanzon et al. |
| 9,921,955 B1 | 3/2018 | Derbeko et al. |
| 9,933,957 B1 | 4/2018 | Cohen et al. |
| 9,934,302 B1 | 4/2018 | Cohen et al. |
| 9,940,205 B2 | 4/2018 | Natanzon |
| 9,940,460 B1 | 4/2018 | Derbeko et al. |
| 9,946,649 B1 | 4/2018 | Natanzon et al. |
| 9,959,061 B1 | 5/2018 | Natanzon et al. |
| 9,965,306 B1 | 5/2018 | Natanzon et al. |
| 9,990,256 B1 | 6/2018 | Natanzon |
| 9,996,539 B1 | 6/2018 | Natanzon |
| 10,007,626 B1 | 6/2018 | Saad et al. |
| 10,019,194 B1 | 7/2018 | Baruch et al. |
| 10,025,931 B1 | 7/2018 | Natanzon et al. |
| 10,031,675 B1 | 7/2018 | Veprinsky et al. |
| 10,031,690 B1 | 7/2018 | Panidis et al. |
| 10,031,692 B2 | 7/2018 | Elron et al. |
| 10,031,703 B1 | 7/2018 | Natanzon et al. |
| 10,037,251 B1 | 7/2018 | Bono et al. |
| 10,042,579 B1 | 8/2018 | Natanzon |
| 10,042,751 B1 | 8/2018 | Veprinsky et al. |
| 10,055,146 B1 | 8/2018 | Natanzon et al. |
| 10,055,148 B1 | 8/2018 | Natanzon et al. |
| 10,061,666 B1 | 8/2018 | Natanzon et al. |
| 10,067,694 B1 | 9/2018 | Natanzon et al. |
| 10,067,837 B1 | 9/2018 | Natanzon et al. |
| 10,078,459 B1 | 9/2018 | Natanzon et al. |
| 10,082,980 B1 | 9/2018 | Cohen et al. |
| 10,083,093 B1 | 9/2018 | Natanzon et al. |
| 10,095,489 B1 | 10/2018 | Lieberman et al. |
| 10,101,943 B1 | 10/2018 | Ayzenberg et al. |
| 10,108,356 B1 | 10/2018 | Natanzon et al. |
| 10,108,507 B1 | 10/2018 | Natanzon |
| 10,108,645 B1 | 10/2018 | Bigman et al. |
| 10,114,581 B1 | 10/2018 | Natanzon et al. |
| 10,120,787 B1 | 11/2018 | Shemer et al. |
| 10,120,925 B1 | 11/2018 | Natanzon et al. |
| 10,126,946 B1 | 11/2018 | Natanzon et al. |
| 10,133,874 B1 | 11/2018 | Natanzon et al. |
| 10,140,039 B1 | 11/2018 | Baruch et al. |
| 10,146,436 B1 | 12/2018 | Natanzon et al. |
| 10,146,639 B1 | 12/2018 | Natanzon et al. |
| 10,146,675 B1 | 12/2018 | Shemer et al. |
| 10,146,961 B1 | 12/2018 | Baruch et al. |
| 10,148,751 B1 | 12/2018 | Natanzon |
| 10,152,246 B1 | 12/2018 | Lieberman et al. |
| 10,152,267 B1 | 12/2018 | Ayzenberg et al. |
| 10,152,384 B1 | 12/2018 | Amit et al. |
| 10,157,014 B1 | 12/2018 | Panidis et al. |
| 10,185,583 B1 | 1/2019 | Natanzon et al. |
| 10,191,677 B1 | 1/2019 | Natanzon et al. |
| 10,191,687 B1 | 1/2019 | Baruch et al. |
| 10,191,755 B1 | 1/2019 | Natanzon et al. |
| 10,203,904 B1 | 2/2019 | Natanzon et al. |
| 10,210,073 B1 | 2/2019 | Baruch et al. |
| 10,223,007 B1 | 3/2019 | Natanzon et al. |
| 10,223,023 B1 | 3/2019 | Natanzon et al. |
| 10,223,131 B1 | 3/2019 | Lieberman et al. |
| 10,229,006 B1 | 3/2019 | Natanzon et al. |
| 10,229,056 B1 | 3/2019 | Panidis et al. |
| 2011/0295804 A1* | 12/2011 | Erofeev .............. H04L 29/0854 707/634 |
| 2014/0379768 A1* | 12/2014 | Matsuzawa ....... G06F 17/30079 707/827 |
| 2015/0169239 A1* | 6/2015 | Sakai .................... G06F 3/0647 711/162 |
| 2015/0234617 A1* | 8/2015 | Li ......................... G06F 3/0647 711/114 |
| 2017/0064030 A1* | 3/2017 | Maskalik ............. H04L 67/2847 |

OTHER PUBLICATIONS

U.S. Appl. No. 14/496,790, filed Sep. 25, 2014, Cohen et al.
U.S. Appl. No. 14/559,036, filed Dec. 3, 2014, Natanzon et al.
U.S. Appl. No. 14/753,389, filed Jun. 29, 2015, Nir et al.
U.S. Appl. No. 14/976,719, filed Dec. 21, 2015, Natanzon.
U.S. Appl. No. 15/085,148, filed Mar. 30, 2016, Baruch et al.
U.S. Appl. No. 15/274,362, filed Sep. 23, 2016, Baruch et al.
U.S. Appl. No. 15/275,768, filed Sep. 26, 2016, Natanzon et al.
U.S. Appl. No. 15/275,756, filed Sep. 26, 2016, Natanzon et al.
U.S. Appl. No. 15/379,940, filed Dec. 15, 2016, Baruch et al.
U.S. Appl. No. 15/386,754, filed Dec. 21, 2016, Sherner et al.
U.S. Appl. No. 15/380,013, filed Dec. 15, 2016, Baruch et al.
U.S. Appl. No. 15/390,996, filed Dec. 27, 2016, Natanzon et al.
U.S. Appl. No. 15/391,030, filed Dec. 27, 2016, Shemer et al.
U.S. Appl. No. 15/970,243, filed May 3, 2018, Schneider et al.
U.S. Appl. No. 16/052,037, filed Aug. 1, 2018, Schneider et al.
U.S. Appl. No. 16/048,763, filed Jul. 30, 2018, Schneider et aL.
U.S. Appl. No. 16/050,400, filed Jul. 31, 2018, Alkalay et al.
U.S. Appl. No. 16/179,295, filed Nov. 2, 2018, Natanzan et al.
U.S. Appl. No. 16/261,174, filed Jan. 29, 2019, Natanzon et al.

* cited by examiner

DATABASE MIGRATION

BACKGROUND

A cloud data base typically runs on a cloud computing platform. A cloud database may be formed using a Database as a Service (DBaaS). The DBaaS is a cloud computing service model that provides users with some form of access to a database (DB) without the need for setting up physical hardware, installing software or configuring for performance. DBaaS allows for DB connectivity without dealing with the DB management. The cloud database may also be generated by being installed on a virtual machine (VM) located in the cloud and requires that a user manage the database.

SUMMARY

In one aspect, a method includes migrating a database object from a source database to a target database, updating a storage of the location of the DB object to be the target database, directly accessing one of the target database and the source database during the migrating and executing, during the migrating, a database command by retrieving the DB object from the other one of the target database and the source database.

In another aspect, an apparatus includes electronic hardware circuitry configured to migrate a database object from a source database to a target database, update a storage of the location of the DB object to be the target database, directly access one of the target database and the source database during the migrating and execute, during the migrating, a database command by retrieving the DB object from the other one of the target database and the source database.

In a further aspect, an article includes a non-transitory computer-readable medium that stores computer-executable instructions. The instructions cause a machine to migrate a database object from a source database to a target database, update a storage of the location of the DB object to be the target database, directly access one of the target database and the source database during the migrating and execute, during the migrating, a database command by retrieving the DB object from the other one of the target database and the source database.

DETAILED DESCRIPTION

In one example, a benefit of using database as a service (DBaaS) is automated database (DB) administration, which saves the user time and money, and allows the user to focus on the application without concern about management, scalability and so forth. However, this benefit does come with a disadvantage. In particular, by not having access to the host of the DB and to the administrative tools available for the administrator, the user is not provided a way to do a DB migration, much less online DB migration.

Some regular DBs provide online migration tools, and it is also possible to do such migration on the VM machine, but when using DBaaS, these capabilities are not applicable. Thus, the user cannot migrate to a different cloud provider, and is sometimes forced to live with an inferior and more expensive database service. Cloud providers are not motivated to provide database migration tools to allow a customer to move away from their DBaaS. Described herein are techniques to allow a user to migrate a DB from one database service (e.g., DBaaS) to another database service (e.g., DBaaS).

Figure 1:
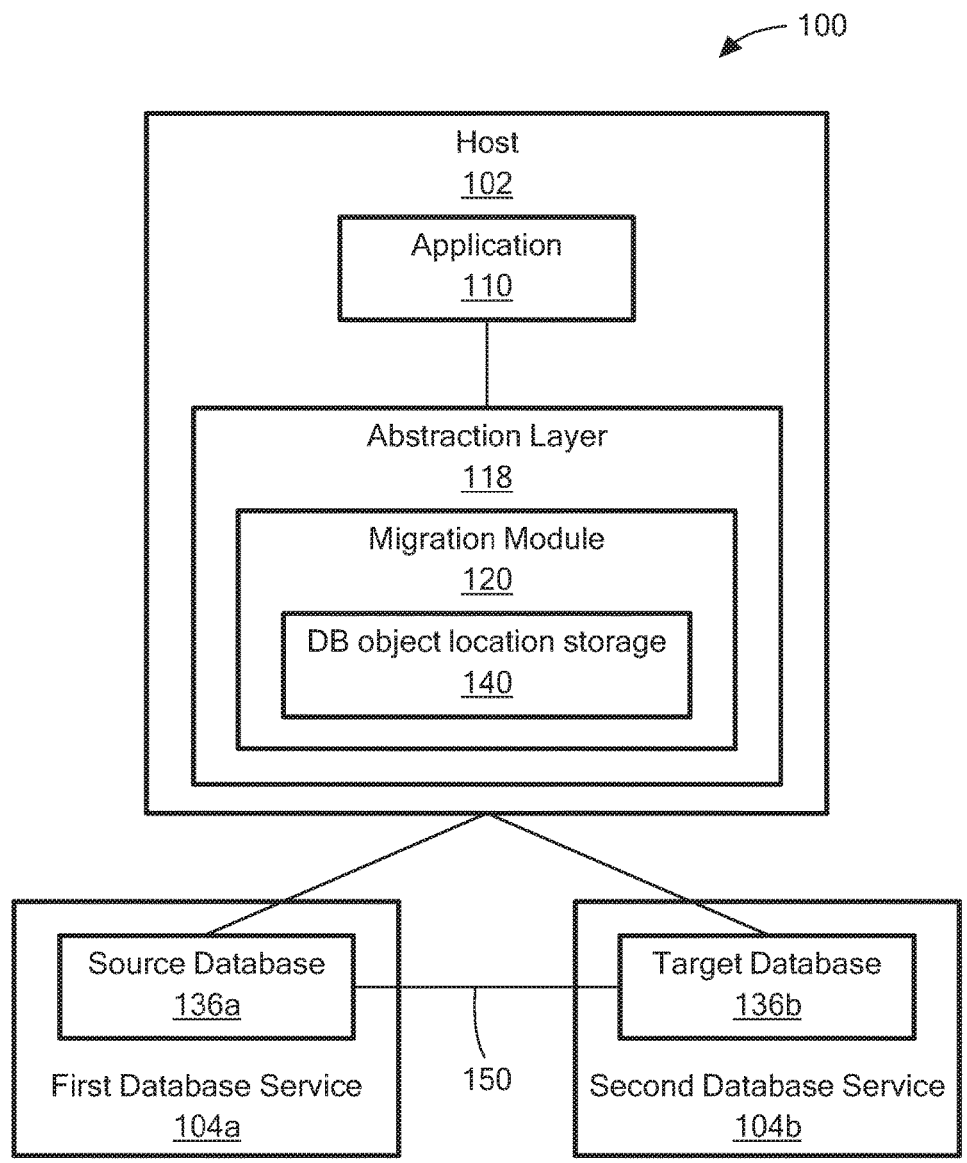
FIG. 1 is a block diagram of an example of a system to migrate a DB from one database service to another database service, according to an embodiment of the disclosure.

Referring to FIG. 1, a system 100 is an example of a system to migrate a database from one database service to another database service. In one example, the migration is from a first database service from a first cloud provider to a second database service from a second cloud provider. In other examples, the migration may be between databases services provided by the same cloud provider.

System 100 includes a host 102, a first database service 104a (e.g., DBaaS), and a second database service 104b (e.g., DBaaS). The host 102 includes an application 110 and an abstraction layer 118 (e.g., a database connectivity abstraction layer) that includes a migration module 120. The first database service 104a includes a source database service 136a and the second database 104b includes a target database 136b. Before database migration the source database 136a has the database information (e.g., database objects) and none of the source database 136a has transferred to target database 136b. After database migration, the target database 136b has the data information and there is no data left at source database 136a. During database migration there is some data on the source database 136a and the target database 136b.

The migration module 120 includes DB object location storage 140 that records where DB objects are located (e.g., either the source database 136a or the target database 136b).

A communications link 150 ties the source database 136a to the target database 136b. As will be further described herein either the source database 136a is accessed directly by the abstraction layer 118 or the target database 136b is accessed directly by the abstraction layer 118. However, in either case, during migration, data may be required to be accessed from both locations. The communication link 150 is used to ensure access of the data required regardless of where it is located and regardless of what database (source or target) is accessed directly.

As will be further described herein the migration module 120 intercepts messages (e.g., database commands using SQL, for example) from the application 110. The application 110 does not know that the migration module 120 is actually sending the messages to either a source database 136a or a target database 136b depending on the database migration.

Figure 2:
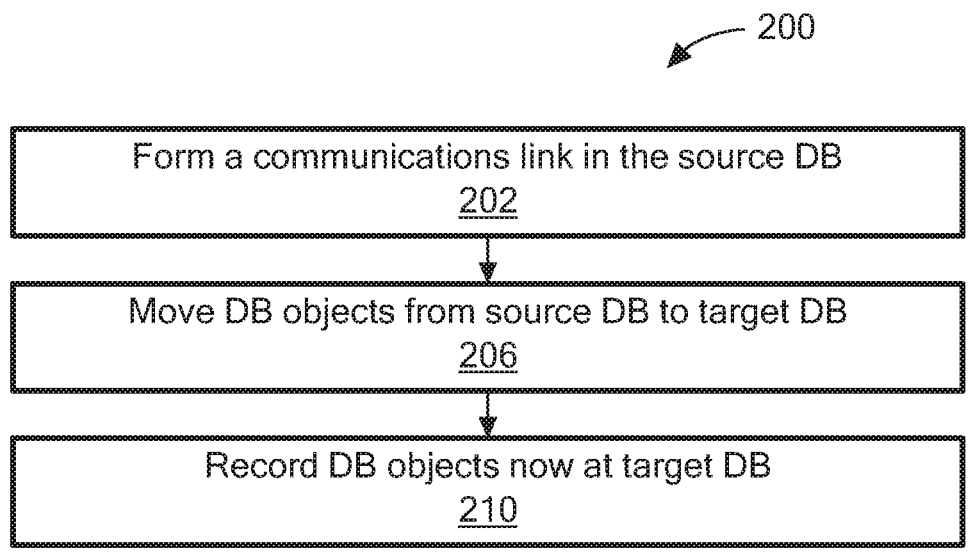
FIG. 2 is a flowchart of an example of a process to migrate a DB from one database service to another database service, according to an embodiment of the disclosure.

Referring to FIG. 2, a process 200 is an example of a process to migrate a DB from one database service to another database service. Process 200 forms a communications link in the source database (202). For example, the migration module 120 establishes a communication link with the source database 136a.

Process 200 moves DB objects from the source database to the target database (206). For example, the migration module 120 moves database objects from the source database 136a to the target database 136b. In one example, a DB object is a table. In another example, the DB object is a character large object (CLOB).

Process 200 records the location of the DB objects at target database (210). For example, for each DB object that has been moved to the target database 136b, the migration module 120 records in the DB object location storage 140 that the DB object is now in the target database 136b. Thus, when the application 110 sends a database command that relates to a DB object on the target database 136b, the migration module 120, after checking the DB object location storage 140, routes the database command to the target database 136b. Furthermore, when an application 110 views from the source database 136a a DB object that has already been migrated a pointer will be used to point to the target database 136b to view the DB object.

Figure 3:
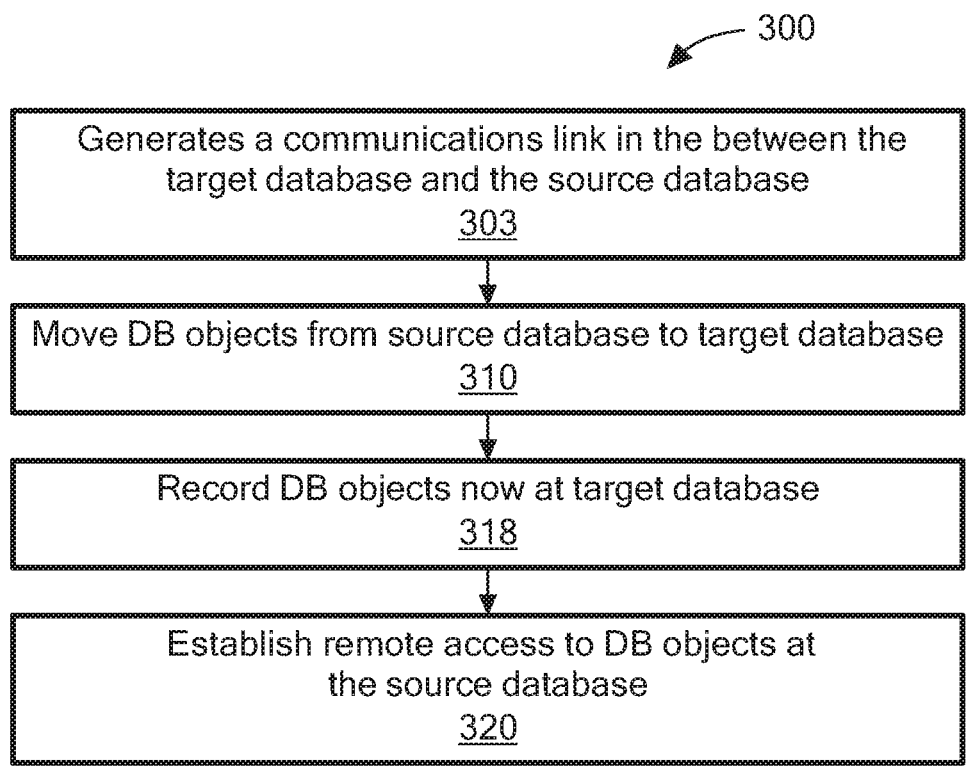
FIG. 3 is a flowchart of an example of a process to use a target database after the process in FIG. 2 has initiated, according to an embodiment of the disclosure.

Referring to FIG. 3, a process 300 is an example of a process to use a target database after the process 200 has initiated. For example, process 300 is started after a majority of the DB object have transferred from the source database 136a to the target database 136b. While the process 300 is an example of directly accessing the target database 136b after process 200 has initiated, one of ordinary skill in the art would recognize that the techniques of process 300 may be applied to the example of accessing the source database 136a directly until after the migration is complete.

Process 300 generates a communications link in the target database (303). For example, the communications link 150 is established between the source database 136a and the target database 136b. Process 300 moves DB objects to the target database (310) and records the DB object now at the target database (318). For example, for each DB object that has been moved to the target database 136b, the migration module 120 records in the DB object location storage 140 that the DB object is now in the target database 136b. Thus, when the application 110 sends a database command that relates to a DB object on the target database 136b, the migration module 120, after checking the DB object location storage 140, routes the database command to the target database 136b.

Process 300 establishes remote access to enable access to DB objects at the source database (320). For example, if directly accessing the target base 136b some DB objects may not have migrated to the target database 136b yet. Remote access is used to access the source database through the communications link to access objects at the source database. In one particular example, relational databases use SQL commands, which may use a join command, for example, that involves multiple database tables. That is, the SQL command may include more than one DB object and each DB needs to be directed to the database that includes the DB object. For example, an SQL command will arrive that needs access to tables from the source database 136a and the target database 136b. In one example, an SQL synonym command is used to establish remote access to DB objects at the source database. In one particular example, an Emp(employee) table may be in the source database 136a and Dept(department) table may be in the target database. Then a synonym command is generated such as a command: synonym to emp using the communications link 150 from the target database 136b to the source database 136a. In one particular example, process 300 may be modified so that either the target database or the source database may be accessed directly depending on how many DB objects have been migrated using the DB object location storage 140. In another particular example, process 300 may be modified so that either the target database 136b or the source database 136a may be accessed depending on where the DB objects are for a particular command (e.g., join command). For example, if all or a majority of the DB objects are at the target database, then the target database is accessed.

Figure 4:
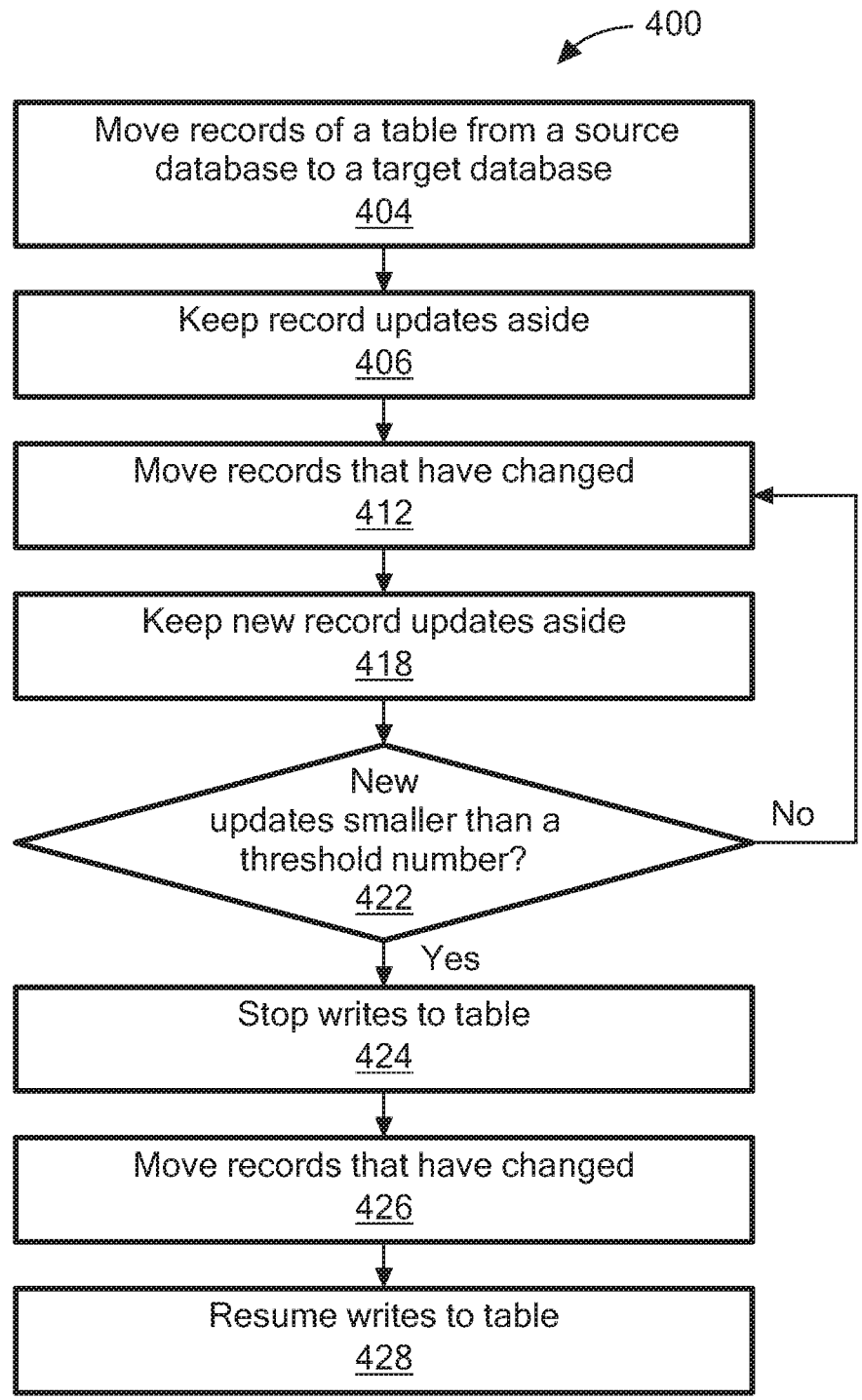
FIG. 4 is a flowchart of an example of a process to move a single table from one database service to another database service, according to an embodiment of the disclosure.

Referring to FIG. 4, a process 400 is an example of a process to move a single table from one database service to another database service. In particular, process 400 maintains data consistency but there is no downtime for the user waiting for the migration of the database to be completed.

Process 400 moves records of a table from a source database to a target database (404). For example, the migration module 120 move the records from of a table from the source database 136a to the target database 136.

Process 400 keeps updates aside (406). For example, the migration module 120 keeps updates (e.g., changes) to the records and they are not applied to the table at the target database 136b. In one example, the updates are kept at the source database 136a in parallel.

Process 400 move records that have changed (412). For example, the records that have changed are moved to the target database 136b.

Process 400 keeps new updates aside (418). For example, processing block 418 is the same as processing block 422.

Process 400 determines if the number of new updates is smaller than a threshold number (422). If the number of new updates is smaller than a threshold number, then process 400 stops writes to the table (424), move the records that have changed (426) and resumes writes to the table (428).

If the number of new updates is not smaller than a threshold number, then process 400 repeats processing blocks 412, 418 and 422.

In other examples, process 400 may be replaced with a process that will stop writes to the table. For example, the migration module 120, which intercepts command messages (e.g., SQLs), parses the command messages to identify which tables are being written to and holds these command messages from writing to a table being migrated until the migration of the table has completed.

Figure 5:
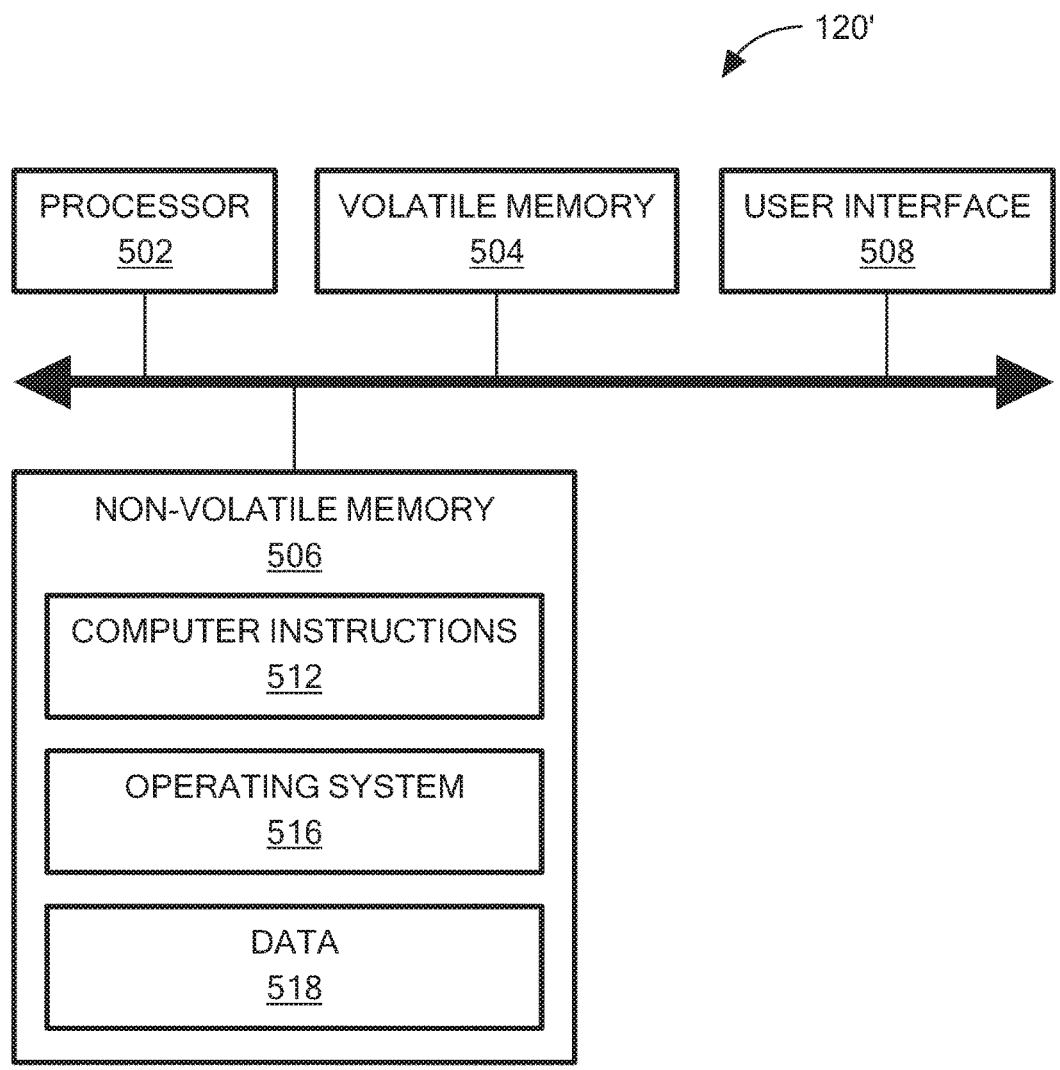
FIG. 5 is a block diagram of an example of a computer on which any portion of the process of FIGS. 2 to 4 may be implemented, according to an embodiment of the disclosure.

Referring to FIG. 5, in one example, a migration module 120 is a migration module 120'. The migration module 120' includes a processor 502, a volatile memory 504, a non-volatile memory 506 (e.g., hard disk) and the user interface (UI) 508 (e.g., a graphical user interface, a mouse, a keyboard, a display, touch screen and so forth). The non-volatile memory 506 stores computer instructions 512, an operating system 516 and data 518. In one example, the computer instructions 512 are executed by the processor 502 out of volatile memory 504 to perform all or part of the processes described herein (e.g., processes 200, 300 and 400).

The processes described herein (e.g., process processes 200, 300 and 400) are not limited to use with the hardware and software of FIG. 5; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 200, 300 and 400 are not limited to the specific processing order of FIGS. 2 to 4, respectively. Rather, any of the processing blocks of FIGS. 2 to 4 may be re-ordered, combined or removed, performed in parallel or in serial, as necessary, to achieve the results set forth above.

The processing blocks (for example, in the processes 200, 300 and 400) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

What is claimed is:

1. A method for migrating a source database to a target database, the method comprising:
   establishing a communication link, via an abstraction layer of a host computer, between the source database and the target database;
   migrating, via the abstraction layer, database (DB) objects from the source database to the target database, wherein during the migrating the method further comprises:
   for each of the DB objects, updating, at the host computer, a storage of the location of the corresponding DB object to be the target database, the location stored in a table;
   intercepting a database command, by the abstraction layer from an application of the host computer, the abstraction layer transparent to the application;
   identifying, from the table, in which of the source database and the target database a corresponding DB object subject to the database command resides;
   directly accessing one of the target database and the source database in which the DB object subject to the database command resides; and
   executing the database command by retrieving the DB object from the one of the target database and the source database.

2. The method of claim 1, wherein at least one of the DB objects is a table, the migrating further comprising:
   moving records of the table from the source database to the target database; and
   after moving the records, moving records that have changed to the target database.

3. The method of claim 2, further comprising keeping the records that have changed aside until the records of the table have moved to the target database.

4. The method of claim 2, further comprising stopping write operations to the table, if a number of record changes is smaller than a threshold number.

5. The method of claim 1, wherein at least one of the database objects is a table, the migrating further comprising
   stopping write operations to a first table of the database until after the first table has been migrated by parsing writes to the first table.

6. The method of claim 1, further comprising:
   upon determining, by the host computer, the DB object has already been migrated from the source database to the target database, applying a pointer with respect to the DB object, to point to the target database.

7. The method of claim 1, wherein the database command is a command to access multiple DB objects, the method further comprising:
   identifying from the table, locations in which the multiple DB objects are stored;
   determining from the table which of the source database and the target database stores a majority of the multiple DB objects;
   directly accessing the one of the source database and the target database determined to store the majority of the multiple DB objects; and
   remotely connecting, via the abstraction layer through one of the source database and the target database determined to store the majority, to the other one of the source database and the target database to access remaining ones of the multiple DB objects.

8. The method of claim 1, wherein the source database resides at a first cloud database service provider and the target database resides at a second cloud database service provider.

9. The method of claim 8, wherein the host computer receives database-as-a-service (DBaaS) services from the first and second cloud database service providers.

10. An apparatus for migrating a source database to a target database, the apparatus comprising:
    electronic hardware circuitry configured to:
    establish a communication link, via an abstraction layer of a host computer, between the source database and the target database;

migrate, via the abstraction layer, database (DB) objects from the source database to the target database, wherein during migration the electronic hardware circuitry is further configured to:
for each of the DB objects, update, at the host computer, a storage of the location of the corresponding DB object to be the target database, the location stored in a table;
intercept a database command, by the abstraction layer from an application of the host computer, the abstraction layer transparent to the application;
identify, from the table, in which of the source database and the target database a corresponding DB object subject to the database command resides;
directly access one of the target database and the source database in which the DB object subject to the database command resides; and
execute the database command by retrieving the DB object from the one of the target database and the source database.

11. The apparatus of claim 10, wherein the circuitry comprises at least one of a processor, a memory, a programmable logic device or a logic gate.

12. The apparatus of claim 10, wherein at least one of the DB objects is a table, the migrating further comprising:
moving records of the table from the source database to the target database; and
after moving the records, moving records that have changed to the target database.

13. The apparatus of claim 12, further comprising circuitry configured to keep the records that have changed aside until the records of the table have moved to the target database.

14. The apparatus of claim 12, further comprising circuitry configured to stop write operations to the table, if a number of record changes is smaller than a threshold number.

15. The apparatus of claim 10, wherein at least one of the database objects is a table, the migrating further comprising:
stopping write operations to a first table of the database until after the first table has been migrated by parsing writes to the first table.

16. An article for migrating a source database to a target database, the article comprising:

a non-transitory computer-readable medium that stores computer-executable instructions, the instructions causing a machine to:
establish a communication link, via an abstraction layer of a host computer, between the source database and the target database;
migrate, via the abstraction layer, a database (DB) object from the source database to the target database, wherein during migration the instructions further cause the machine to:
for each of the DB objects, update, at the host computer, a storage of the location of the corresponding DB object to be the target database, the location stored in a table;
intercept a database command, by the abstraction layer from an application of the host computer, the abstraction layer transparent to the application;
identify, from the table, in which of the source database and the target database a corresponding DB object subject to the database command resides;
directly access one of the target database and the source database in which the DB object subject to the database command resides; and
execute the database command by retrieving the DB object from the other one of the target database and the source database.

17. The article of claim 16, wherein at least one of the DB objects is a table, the migrating further comprising:
moving records of the table from the source database to the target database; and
after moving the records, moving records that have changed to the target database.

18. The article of claim 17, further comprising instructions causing the machine to keep the records that have changed aside until the records of the table have moved to the target database.

19. The article of claim 17, further comprising instructions causing the machine to stop write operations to the table, if a number of record changes is smaller than a threshold number.

20. The article of claim 16, wherein at least one of the database objects is a table, the migrating further comprising:
stopping write operations to a first table of the database until after the first table has been migrated by parsing writes to the first table.

* * * * *